United States Patent
Lee et al.

(10) Patent No.: US 11,119,534 B2
(45) Date of Patent: Sep. 14, 2021

(54) FOLDABLE DISPLAY DEVICE

(71) Applicant: LG Display Co., Ltd., Seoul (KR)

(72) Inventors: Dai-Yun Lee, Gimpo-si (KR); Seung-O Jeon, Seoul (KR); Young-Joon Yun, Paju-si (KR); Shin-Suk Lee, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 110 days.

(21) Appl. No.: 15/827,742

(22) Filed: Nov. 30, 2017

(65) Prior Publication Data

US 2018/0150102 A1 May 31, 2018

(30) Foreign Application Priority Data

Nov. 30, 2016 (KR) .................. 10-2016-0162343

(51) Int. Cl.
*G06F 1/16* (2006.01)
*G06F 3/14* (2006.01)

(52) U.S. Cl.
CPC ............ *G06F 1/1616* (2013.01); *G06F 1/16* (2013.01); *G06F 1/1641* (2013.01); *G06F 1/1652* (2013.01); *G06F 1/1675* (2013.01); *G06F 3/1423* (2013.01); *G06F 2203/04102* (2013.01)

(58) Field of Classification Search
CPC .... G06F 1/1652; G06F 1/1616; G06F 1/1641; G06F 1/1624; G06F 1/1637; G06F 1/1675; G06F 1/1618; G06F 1/181; G06F 1/1677; G06F 1/1679; G06F 3/0416; G06F 3/0412; G06F 1/1656; G06F 1/16; G06F 1/1626; G06F 2203/04102; H04M 1/0268; H04M 1/0214; H04M 1/0237; H05K 5/0017; H05K 7/1427; G02F 1/133308; G02F 1/133305; G02F 1/133388; G02F 1/1601; G02F 1/1616; G02F 1/1641; G02F 1/1624; G02F 1/16; G02F 1/1677; G02F 1/1637;
(Continued)

(56) References Cited

U.S. PATENT DOCUMENTS 6,003,052 A * 12/1999 Yamagata ............. G06F 1/1626
345/905
7,548,415 B2 * 6/2009 Kim ...................... G06F 1/1601
345/1.1
(Continued)

FOREIGN PATENT DOCUMENTS

CN 101397864 A 4/2009
CN 103778858 A 5/2014
(Continued)

OTHER PUBLICATIONS

China National Intellectual Property Administration, First Office Action, CN Patent Application No. 201711239456.3, dated Sep. 2, 2019, 21 pages.
(Continued)

*Primary Examiner* — Dismery Mercedes
(74) *Attorney, Agent, or Firm* — Fenwick & West LLP

(57) ABSTRACT

Disclosed is a foldable display device in which a display panel and a cover plate are combined within a case. when the display panel and the case are being folded in one direction, the cover plate is slidably transferred within the case so as to correspond to a deformed length of the case.

7 Claims, 4 Drawing Sheets

(58) Field of Classification Search
CPC .................. G02F 1/1652; G02F 3/0412; G02F 2203/04102
See application file for complete search history.

(56) References Cited

U.S. PATENT DOCUMENTS

| | | | | |
|---|---|---|---|---|
| 8,804,349 | B2* | 8/2014 | Lee | H04M 1/0268 |
| | | | | 361/749 |
| 8,947,866 | B2* | 2/2015 | Jacobs | H01L 51/5237 |
| | | | | 361/679.21 |
| 9,681,538 | B2* | 6/2017 | Ahn | H05K 1/028 |
| 10,028,395 | B2* | 7/2018 | Chen | H05K 5/0217 |
| 10,152,086 | B2* | 12/2018 | Choi | G06F 1/1652 |
| 10,324,678 | B2 | 6/2019 | Wang et al. | |
| 10,331,173 | B2* | 6/2019 | Cho | G06F 1/1652 |
| 10,912,213 | B2* | 2/2021 | Woo | G06F 1/1679 |
| 2012/0002360 | A1* | 1/2012 | Seo | G06F 1/1652 |
| | | | | 361/679.01 |
| 2012/0162876 | A1* | 6/2012 | Kim | H04M 1/0237 |
| | | | | 361/679.01 |
| 2012/0212430 | A1* | 8/2012 | Jung | G06F 1/1626 |
| | | | | 345/173 |
| 2012/0236484 | A1* | 9/2012 | Miyake | G06F 1/1616 |
| | | | | 361/679.01 |
| 2013/0010405 | A1* | 1/2013 | Rothkopf | H04M 1/0216 |
| | | | | 361/679.01 |
| 2013/0058063 | A1* | 3/2013 | O'Brien | G06F 1/1624 |
| | | | | 361/807 |
| 2014/0029171 | A1* | 1/2014 | Lee | G09F 9/301 |
| | | | | 361/679.01 |
| 2014/0029190 | A1* | 1/2014 | Sato | G06F 1/1641 |
| | | | | 361/679.27 |
| 2014/0111954 | A1 | 4/2014 | Lee et al. | |
| 2014/0177154 | A1* | 6/2014 | Lee | G06F 1/1637 |
| | | | | 361/679.26 |
| 2015/0241925 | A1* | 8/2015 | Seo | G06F 1/1681 |
| | | | | 361/679.27 |
| 2016/0143131 | A1* | 5/2016 | Ahn | H04M 1/0237 |
| | | | | 361/749 |
| 2016/0216737 | A1* | 7/2016 | Hayk | G06F 1/1652 |
| 2016/0291642 | A1* | 10/2016 | Kwak | G06F 3/04845 |
| 2017/0006725 | A1* | 1/2017 | Ahn | H05K 1/028 |
| 2017/0038798 | A1* | 2/2017 | Lee | G06F 1/1616 |
| 2017/0177130 | A1* | 6/2017 | Endo | G06F 1/1652 |
| 2018/0107250 | A1* | 4/2018 | Cho | G06F 1/1652 |
| 2018/0110144 | A1 | 4/2018 | Wang et al. | |
| 2019/0306290 | A1* | 10/2019 | Lee | G06F 1/1641 |
| 2020/0098325 | A1* | 3/2020 | Kim | G06F 3/1446 |

FOREIGN PATENT DOCUMENTS

| | | |
|---|---|---|
| CN | 203950514 U | 11/2014 |
| CN | 204331666 U | 5/2015 |
| CN | 105632345 A | 6/2016 |
| CN | 105830140 A | 8/2016 |
| CN | 106097896 A | 11/2016 |
| KR | 10-2009-008703 A | 8/2009 |

OTHER PUBLICATIONS

China National Intellectual Property Administration, Notification of the Second Office Action, CN Patent Application No. 201711239456.3, dated May 9, 2020, 22 pages.
China National Intellectual Property Administration, Office Action, CN Patent Application No. 201711239456.3, dated Jan. 6, 2021, 16 pages.

* cited by examiner

FOLDABLE DISPLAY DEVICE

This application claims the benefit of Korean Patent Application No. 10-2016-0162343, filed on Nov. 30, 2016, which is hereby incorporated by reference as if fully set forth herein.

BACKGROUND

Field of the Invention

The present invention relates to a foldable display device in which a display panel may be used in a folded or unfolded state.

Discussion of the Related Art

Recently, mobile terminals, such as wireless terminals, personal digital assistants (PDAs), portable multimedia players (PMPs), tablets, etc., tend to be miniaturized for portability.

However, since users want to receive information from various content, such as characters, moving pictures, still pictures, MP3, games, etc., through screens of mobile terminals, large-sized or wide display screens have been required.

Miniaturization of mobile terminals causes size reduction of display screens and, thus, there is a trade-off between these two requirements.

As measures to overcome such a limit, a flexible display device, such as a bendable display device or a foldable display device, has been developed.

Such a flexible display device may be implemented as an organic electroluminescent device in which a substrate is formed of plastic, and the organic electroluminescent device, which is a self-luminous device, does not use a backlight in a liquid crystal display, which is a non-luminous device, and may thus be lightweight and thin.

Further, since the flexible display device may be conveniently portable when it is folded and achieve a large-scale screen when the flexible display device is unfolded, the flexible display device may be applied to various fields, i.e., not only mobile equipment, such as mobile phones, ultra-mobile PCs, e-books, electronic newspapers, etc., but also TVs, monitors, etc.

When a foldable display device is used as the flexible display device, hinge structures are fastened to a folding area of a display panel.

Here, hinges, which are generally used, are combined with a connection part between two sections of display panel so as to rotatable and, if the display panel overlapping another housing or substrate is folded, the display panel and the substrate are stretched to different lengths.

If the display panel is stretched to a length different from the substrate while the display panel is folded, a larger amount of tension is applied to an outer folded part than an inner folded part of the display device.

That is, in hinge structures which are conventionally used in a flexible display device, since, whenever a display panel is folded, a larger amount of tension is applied to an outer area than an inner area of the display panel, the display panel or a substrate may be easily damaged.

SUMMARY

Accordingly, the present disclosure is directed to a foldable display device that substantially obviates one or more problems due to limitations and disadvantages of the related art.

An objective of the present disclosure is to provide a foldable display device which may slidably transfer a display panel according to length change of an inner part and an outer part of the display panel during a process of folding or unfolding the foldable display device so as to prevent damage to the display panel.

Another objective of the present disclosure is to provide a foldable display device which may provide tensile force to a display panel so as to completely flatly unfold the display panel folded during a folding process of the foldable display device.

Additional advantages, objectives, and features of the present disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objectives and other advantages and in accordance with the purpose of the invention, as embodied and broadly described herein, a foldable display device includes a display panel, a cover plate configured to at least a part of the display panel, and a case configured to surround the outer surface of the cover plate, wherein the cover plate is slidably transferred within the case so as to correspond to relative length change of the case during a process of folding the display panel.

The foldable display device may further include a restoring unit applying tensile force to the cover plate combined with the display panel within the case so as to restore the folded display panel within the case to an unfolded state thereof.

In other embodiments, a foldable display device includes a display panel bendable along a bending line, and a cover plate disposed so as to surround a non-display area of the upper surface of the display panel and at least parts of the side and lower surfaces of the display panel. In this embodiment, the cover plate is at a first distance from the bending line when the foldable display device is folded at a first angle, and the cover plate is at a second distance from the bending line when the foldable display device is folded at a second angle larger than the first angle, the second distance smaller than the first distance.

The foldable display device may further include a guide member protruding from an outer side surface of the cover plate, and a guide rail provided on an inner side surface of a case so that the guide member is inserted into the guide rail. The guide member is at the first distance from the bending line when the foldable display device is folded at the first angle, and the guide member is at the second distance from the bending line when the foldable display device is folded at the second angle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
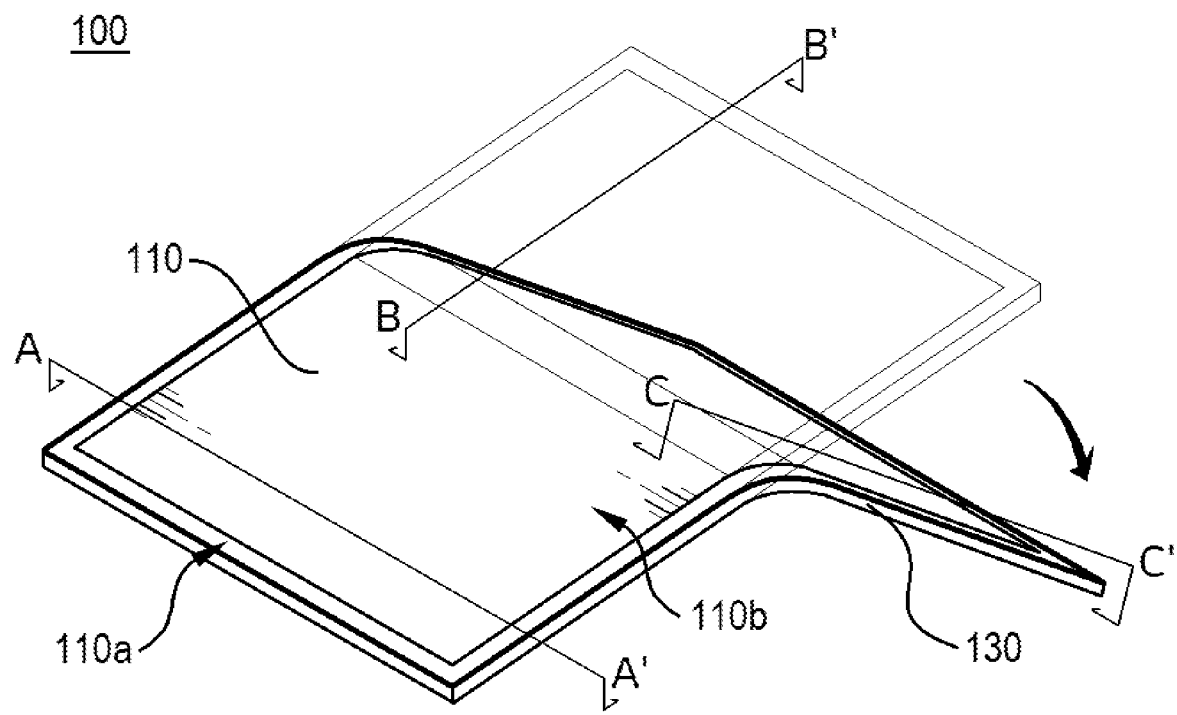
FIG. 1 is a perspective view illustrating a folded state of a foldable display device in accordance with one embodiment.

Reference will now be made in detail to various embodiments of the present disclosure, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the present invention rather unclear. Those skilled in the art will appreciate that any features illustrated in the drawings may be magnified, reduced or simplified for ease of description, and the drawings and elements thereof are not always illustrated to scale.

Figure 2:
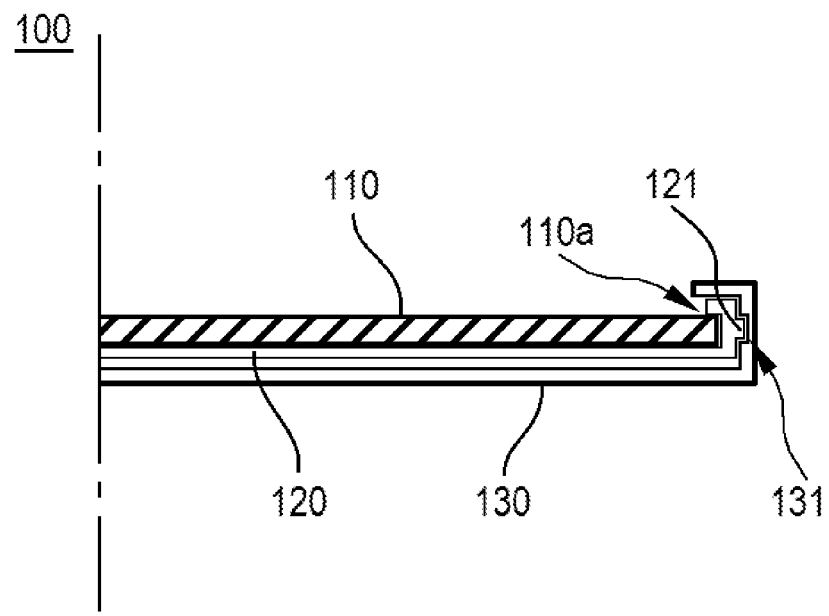
FIG. 2 is an exemplary cross-sectional view of the foldable display device shown in FIG. 1, taken along line A-A'.

FIG. 1 is a perspective view illustrating a folded state of a foldable display device in accordance with one embodiment, and FIG. 2 is an exemplary cross-sectional view of the foldable display device shown in FIG. 1, taken along line A-A'.

With reference to FIGS. 1 and 2, a foldable display device 100 in accordance with one embodiment includes a display panel 110 displaying an image, a cover plate 120 disposed so as to partially surround the display panel 110, and a case 130 contacting the outer surface of the cover plate 120 to protect the cover plate 120.

A non-display area 110a is provided at the edge of the upper surface of the display panel 110, and a display area 110b in which an image is displayed is provided within the non-display area 110a. The display panel 110 has flexibility, i.e., is flexibly bendable, and may be folded at a designated angle or unfolded through a folding unit 150 (with reference to FIG. 4) provided on the lower surface of the display panel 110.

The display panel 110 may include organic light emitting diodes (OLEDs). The display panel 110 has a rectangular shape and, particularly, has a wide screen shape in which a horizontal length thereof is greater than a vertical length thereof. However, the display panel 110 is not limited to the above shape, and may have a circular or polygonal shape and be formed in an oval, triangular or lozenge shape through a folding process.

As shown in FIG. 2, the cover plate 120 is combined with the display panel 100 so as to cover the non-display area 110a of the upper surface, parts of the side surfaces and a part of the lower surface of the display panel 100.

The cover plate 120 has an approximately C-shaped cross-section, an upper surface 120a of the cover plate 120 covers the non-display area 110a, side surfaces 120b of the cover plate 120 cover parts of the long side surfaces of the display panel 110 corresponding to the length direction and the entirety of the short side surfaces of the display panel 110, and a lower surface 120c covers most regions of the lower surface of the display panel 110. That is, the cover plate 120 is disposed so as not to cover parts of the side and lower surfaces of the display panel 110 where the folding unit 150 is located on the lower surface of the display panel 110 in a folding direction of the display panel 110. The reason for this is to prevent the cover plate 120 from interfering with the folding unit 150 or the folding area of the display panel 110 during the folding process of the display panel 110.

A first guide member 121 protrudes from one of the cover plate 120 and the case 130, and a first guide rail 131 is provided on the case 130 so that the first guide member 121 is inserted into the first guide rail 131.

More particularly, as shown in FIG. 2, the first guide member 121 protrudes from the outer side surface 120b of the cover plate 120, and the first guide rail 131 is provided on the inner side surface of the case 130. Therefore, the cover plate 120 is combined with the case 130 so as to be slidably transferred within the case 130.

The cover plate 120 is disposed such that one side end of the cover plate 120 in the length direction is fixed to the inside of the case 130, and the other side end of the cover plate 120 is slidably transferred within the case 130. In some embodiments, the cover plate 120 may be disposed such that both side ends of the cover plate 120 may be slidably transferred. However, only if one side end of the cover plate 120 is fixed to the inside of the case 130, it is possible to prevent the cover plate 120 from being unnecessarily transferred within the case 130.

Therefore, when the foldable display device 100 is folded, one side end of the display panel 110 in the length direction together with one side end of the cover plate 120 is fixed to the inside of the case 130, and the other side end of the display panel 110 together with the other side end of the cover plate 120 is slidably transferred. Therefore, if the foldable display device 100 is folded, the foldable display device 100 may cope with relative length change between the display panel 110 and the case 130 and thus preventing damage to the display panel 110.

Figure 3:
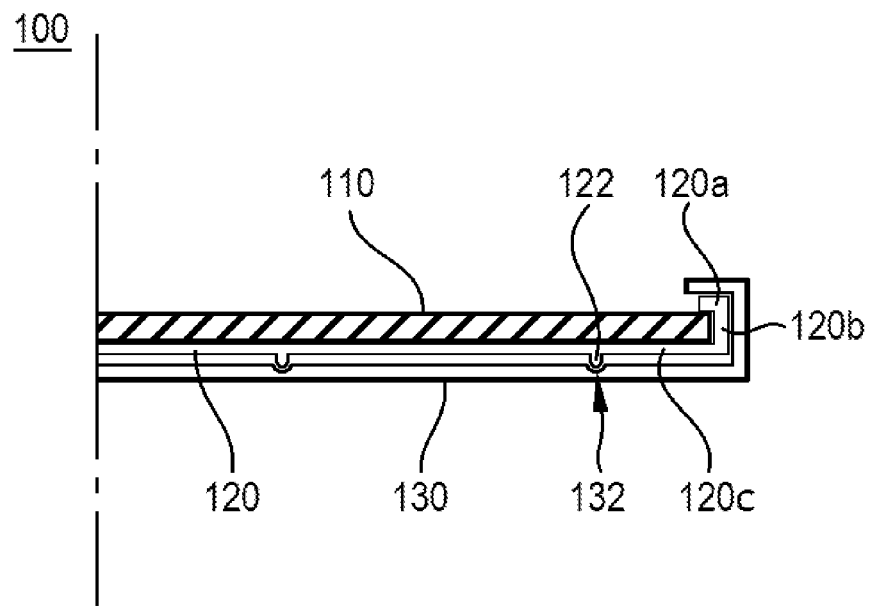
FIG. 3 is another exemplary cross-sectional view of the foldable display device shown in FIG. 1, taken along line A-A'.

FIG. 3 is another exemplary cross-sectional view of the foldable display device shown in FIG. 1, taken along line A-A'. Hereinafter, some parts of the foldable display device which are substantially the same as those of the foldable display device of FIG. 2 are denoted by the same reference numerals even though they are depicted in different drawings.

With reference to FIG. 3, differently from the sliding structure disposed on the side surface of the cover plate 120 in the length direction of the display panel 110 of FIG. 2, sliding structures are disposed in parallel on the bottom surface of the cover plate 120 in the length direction of the display panel 110.

That is, second guide members 122 are provided in parallel on the bottom surface of the cover plate 120 in the length direction of the display panel 110, and second guide rails 132 are provided on the inner upper surface of the case 130 such that the second guide members 122 are inserted into the second guide rails 132. Therefore, if the foldable display device 100 is folded, the display panel 110 and the cover plate 120 may be slidably transferred within the case 130 under the condition that the display panel 110 and the cover plate 120 are combined, and damage to the display panel 110 due to relative length change between the display panel 110 and the case 130 may be prevented.

In some embodiments, the second guide members 122 may be formed on the inner upper surface of the case 130, and the second guide rails 132 may be formed on the bottom surface of the cover plate 120.

Further, all of the guide members 121 and 122 and the guide rails 131 and 132 shown in FIGS. 2 and 3 may be provided on the side and lower surfaces of one cover plate and the inner side and upper surfaces of one case.

Figure 4:
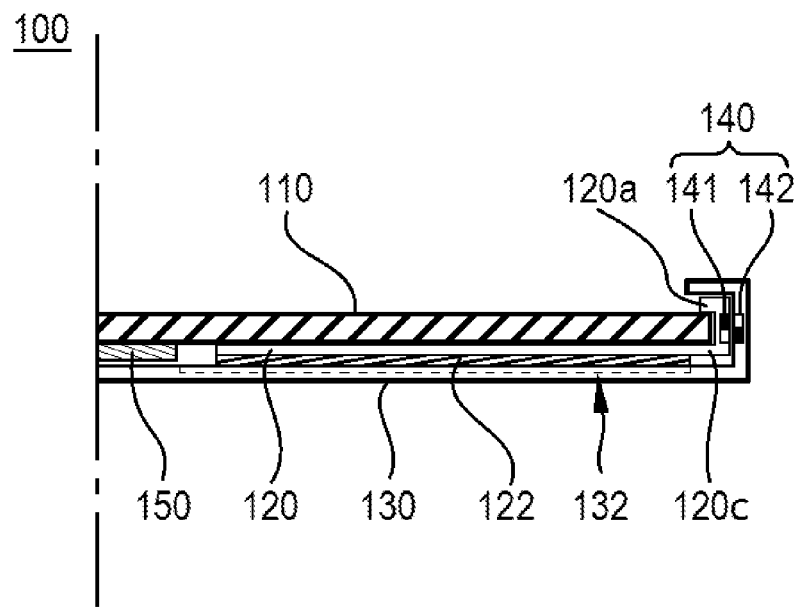
FIG. 4 is a cross-sectional view of the foldable display device shown in FIG. 1 in an unfolded state, taken along line B-B'.

FIG. 4 is a cross-sectional view of the foldable display device shown in FIG. 1 in an unfolded state, taken along line B-B'.

FIG. 4 illustrates a partial cross-section of the foldable display device 100 in the length direction. Here, the other side ends of the display panel 110 and the cover plate 120 which may be slidably transferred are illustrated. Therefore, it is assumed that one side end of each of the display panel 110 and the cover plate 120 of the foldable display device 100 is fixed to the inside of the case 130.

The foldable display device 100 of FIG. 4 is unfolded in a flat state. Therefore, the display panel 110 and the cover plate 120 are combined and disposed adjacent to the inner surface of the case 130.

The second guide members 122 provided on the lower surface 120c of the cover plate 120 are located under the condition that the second guide members 122 are not slidably transferred on the second guide rails 132.

Further, a restoring unit 140 is provided between the outer surface of the cover plate 120 and the inner surface of the case 130. The restoring unit 140 includes a first magnetic material 141 provided on the outer surface of the other side of the cover plate 120, and a second magnetic material 142 provided on the inner surface of the case 130 opposite the first magnetic material 141.

The first magnetic material 141 and the second magnetic material 142 are disposed such that attractive force is applied therebetween, and such attractive force pulls the cover plate 120 and thus provides a function of improving flatness of the display panel 110, when the display panel 110 in the folded state is restored to an unfolded state. Therefore, the display panel 110 may have improved reliability.

Figure 5:
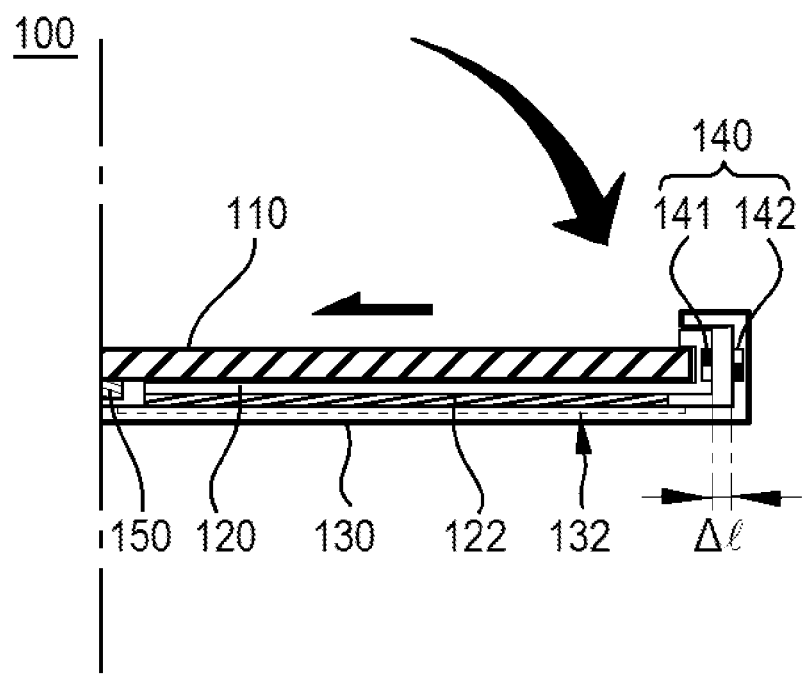
FIG. 5 is a cross-sectional view of the foldable display device shown in FIG. 1 in the folded state, taken along line C-C'.

FIG. 5 is a cross-sectional view of the foldable display device shown in FIG. 1 in the folded state, taken along line C-C'.

FIG. 5 illustrates a partial cross-section of the foldable display device 100 in the length direction and, more particularly, illustrates the other side end of the cover plate 120 which may be slidably transferred under the condition that the display panel 110 and the cover plate 120 are combined.

The foldable display device 100 shown in FIG. 5 is in a state in which the central part thereof shown in FIG. 1 is folded by the folding unit 150. Therefore, the display panel 110 and the cover plate 120, which are combined, are spaced apart from the inner surface of the case 130.

For example, if the foldable display device 100 is folded at a designated angle in an outer folding manner, as shown in FIG. 1, the display panel 110 is disposed at the outside of the case 130 and, thus, the display panel 110 becomes shorter than the case 130 and the case 130 becomes longer than the display panel 110. Then, there is a length difference (a separation distance 1) between the case 130 and the display panel 110. Here, as exemplarily shown in FIG. 5, the display panel 110 and the cover plate 120 are slidably transferred left within the case 130 due to the relatively short length of the display panel 110. Therefore, the cover plate 120 is relatively transferred towards the side end thereof fixed to the inside of the case 130 during the folding process of the display panel 110 and may thus prevent damage to the display panel 110.

In some embodiments, the cover plate 120 is at a first distance from a bending line of the foldable display device 100 when the foldable display device 100 is folded at a first angle, and the cover plate 120 is at a second distance from the bending line when the foldable display device 100 is folded at a second angle larger than the first angle, the second distance smaller than the first distance.

Furthermore, the second guide members 122 together with the cover plate 120 are slidably transferred left on the second guide rails 132 by the separation distance Δ1, and, if the display panel 110 and the cover plate 120 are restored to original states thereof, the second guide members 122 together with the cover plate 120 are slidably transferred right and restored to original positions thereof.

In some embodiments, the second guide member 122 is at a first distance from the bending line of the foldable display device 100 when the foldable display device 100 is folded at a first angle, and the second guide member 122 is at a second distance from the bending line when the foldable display device 100 is folded at a second angle larger than the first angle, the second distance smaller than the first distance.

The restoring unit 140 is disposed such that the first magnetic material 141 and the second magnetic material 142 are spaced apart from each other by the separation distance Δ1, but attractive force is still applied therebetween. Therefore, if the cover plate 120 and the case 130 are restored to original states thereof, such attractive force is increased and, thus, flatness of the display panel 110 is improved after restoration of the display panel 110 to a flat state. If the first and second magnetic materials 141 and 142 are located on the outer side surface of the cover plate 120 and the inner side surface of the case 130, the overall thickness of the foldable display device 100 may be reduced.

Although not shown in the drawings, the first magnetic material 141 and the second magnetic material 142 may be located on the lower surface of the other side end of the cover plate 120 and the upper surface of the case 130 corresponding thereto. If the first and second magnetic materials 141 and 142 are located on the lower surface of the cover plate 120 and the upper surface of the case 130, the overall size of the foldable display device 100 may be reduced.

Furthermore, although not shown in the drawings, the restoring unit 140 may include an elastic spring (not shown) instead of the magnetic materials 141 and 142. The elastic spring may be interposed between the cover plate 120 and the case 130 and be mounted in a direction of applying tensile force or compressive force therebetween so as to improve flatness in the unfolded state of the display panel 110.

Figure 6:
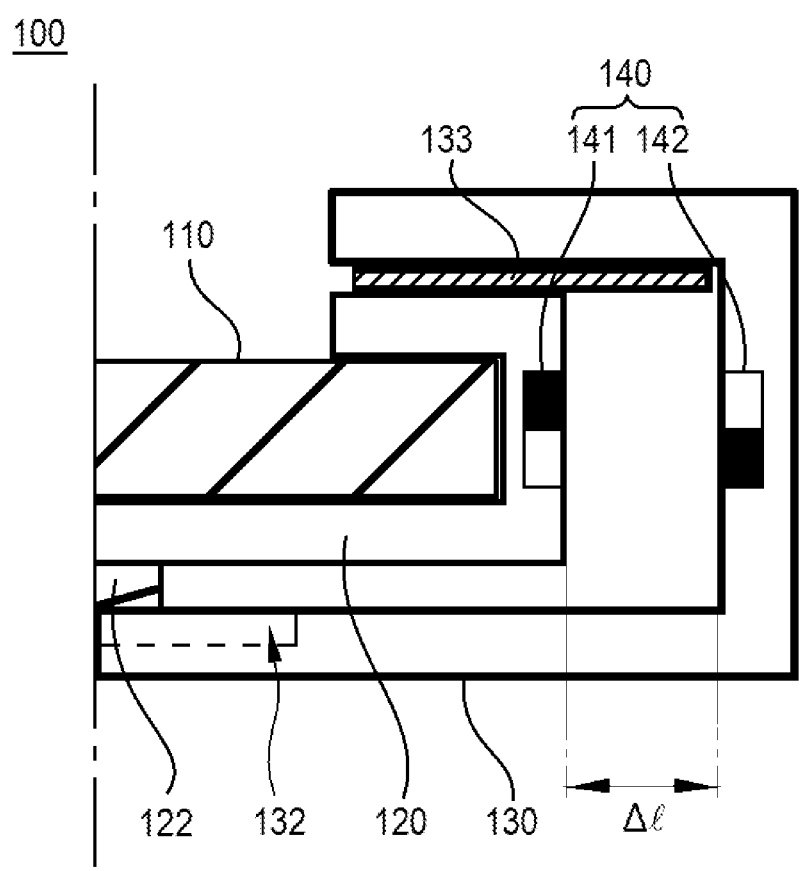
FIG. 6 is an enlarged cross-sectional view illustrating the edge of the foldable display device shown in FIG. 5.

FIG. 6 is an enlarged cross-sectional view illustrating the edge of the foldable display device shown in FIG. 5.

With reference to FIG. 6, the foldable display device 100 includes a finishing member 133 interposed between the upper surface 120a of the cover plate 120 and the lower surface of the upper part of the case 130.

One surface of the finishing member 133 is attached to the lower surface of the upper part of the case 130 facing the cover plate 120, and the other surface of the finishing member 133 contacts the upper surface 120a of the cover plate 120. The finishing member 130 serves to prevent the cover plate 120 from being damaged due to frictional interaction with the case 130 when the cover plate 120 is slidably transferred on the case 130.

Further, the finishing member 133 shields a space between the cover plate 120 and the case 130 and thus has a sealing function of preventing foreign substances from entering the space between the cover plate 120 and the case 130.

As is apparent from the above description, a foldable display device in accordance with the present invention has effects, as follows.

First, a display panel and a cover plate are combined so as to be slidably transferred on a case and, thus, damage to the display panel during a folding process may be reduced.

Second, a restoring unit is provided between the case and the cover plate combined with the display panel and may thus provide tensile force so as to completely flatly unfold the folded display panel.

Third, since the folded display panel may be completely flatly unfolded, flatness of the display panel may be improved and reliability of the foldable display device may be improved.

Fourth, generation of noise may be prevented even if the display panel is operated for a long time, and the display panel may be used semipermanently.

Fifth, the folding operation of the display panel may be stably and softly executed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A foldable display device comprising:
   a display panel comprising an upper surface having a display area for displaying images and a non-display area surrounding the display area, a lower surface opposite to the upper surface, and a side surface between the upper surface and the bottom surface;
   a cover plate fixed to the display panel, the cover plate comprising:
      a top cover portion covering at least a part of the non-display area of the upper surface of the display panel,
      a bottom cover portion covering at least a part of the lower surface of the display panel, and
      a side cover portion covering at least a part of the side surface of the display panel, the side cover portion between the top cover portion and the bottom cover portion;
   a case contacting an outer surface of the cover plate so that the cover plate and the display panel are slidably transferable within the case, the case comprising a side case portion, wherein the side cover portion of the cover plate faces the side case portion of the case;
   a restoring unit interposed between the side cover portion of the cover plate and the side case portion of the case and applying tensile force between the side cover portion of the cover plate and the side case portion of the case to pull the cover plate towards the case; and
   a finishing member interposed between the top cover portion of the cover plate and the case,
   wherein the finishing member is configured to prevent the cover plate from being damaged when the cover plate is slidably transferred on the case, and shields a space between the cover plate and the case.

2. The foldable display device according to claim 1, wherein one section of the cover plate is fixed to the case in a sliding direction of the cover plate, and another section of the cover plate is slidably transferrable within the case.

3. The foldable display device according to claim 2, wherein the restoring unit includes:
   a first magnetic material provided on the outer surface of the side cover portion of the cover plate; and
   a second magnetic material provided on an inner surface of the side case portion of the case so as to be opposite to the first magnetic material.

4. The foldable display device according to claim 2, wherein the restoring unit includes:
   a first magnetic material provided on the bottom cover portion of the cover plate; and
   a second magnetic material provided on an inner upper surface of the case so as to be opposite to the first magnetic material.

5. The foldable display device according to claim 2, wherein the restoring unit includes at least one elastic spring provided with one end connected to the side cover portion of the cover plate and with another end connected to the side case portion of the case so as to restore the slidably transferred cover plate on the case.

6. The foldable display device according to claim 2, further comprising:
   a guide member protruding from one of an outer surface of the side cover portion of the cover plate and an inner surface of the side case portion of the case; and
   a guide rail provided on the other of the outer surface of the side cover portion of the cover plate and the inner surface of the side case portion of the case so that the guide member is inserted into the guide rail.

7. The foldable display device according to claim 2, further comprising:
   a guide member protruding from one of a bottom surface of the bottom cover portion of the cover plate and an inner upper surface of the case; and
   a guide rail provided on the other of the bottom surface of the bottom cover portion of the cover plate and the inner upper surface of the case so that the guide member is inserted into the guide rail.

* * * * *